W. P. KIDDER.
TYPEWRITER.
APPLICATION FILED MAY 19, 1919.

1,412,351.

Patented Apr. 11, 1922.
6 SHEETS—SHEET 1.

Inventor
Wellington P. Kidder
By
Attorney

W. P. KIDDER.
TYPEWRITER.
APPLICATION FILED MAY 19, 1919.

1,412,351.

Patented Apr. 11, 1922.
6 SHEETS—SHEET 4.

Inventor
Wellington P Kidder
By
Attorney.

W. P. KIDDER.
TYPEWRITER.
APPLICATION FILED MAY 19, 1919.

1,412,351.

Patented Apr. 11, 1922.
6 SHEETS—SHEET 6.

Inventor
Wellington P. Kidder
By *Ellis Spear Jr.*
Attorney

UNITED STATES PATENT OFFICE.

WELLINGTON P. KIDDER, OF BOSTON, MASSACHUSETTS, ASSIGNOR TO HARRY BATES, OF NEW YORK, N. Y.

TYPEWRITER.

1,412,351.  Specification of Letters Patent.  Patented Apr. 11, 1922.

Application filed May 19, 1919. Serial No. 298,289.

*To all whom it may concern:*

Be it known that I, WELLINGTON P. KIDDER, a citizen of the United States, residing at Boston, county of Suffolk, Commonwealth of Massachusetts, have invented certain new and useful Improvements in Typewriters, of which the following is a specification.

This invention relates to typewriters and particularly to machines of such small, compact and readily portable type as to afford substantially a pocket typewriter. My present invention contemplates mechanism constituting such a machine either with or without type shift giving in each case a maximum number of characters with minimum bulk and weight and capable of simple and economical manufacture.

The various improved elements which combine to produce this mechanism will be pointed out and described in connection with the accompanying drawings in which I have shown as an illustrative embodiment a machine embodying my invention in practical and commercial form.

Throughout the drawings and specification like reference characters are employed to indicate corresponding parts, and in the drawings:

Figs. 5 and 6 details of the segment shift, Fig. 7 a sectional view taken across the machine showing carriage and type segments, Fig. 8 a plan detail partly in section of the ribbon shift, Fig. 9 a sectional detail of the ribbon case, ratchet feed and shift position, Fig. 10 an elevation of the ribbon case, Fig. 11 a sectional detail of the carriage motor,

Figure 15:
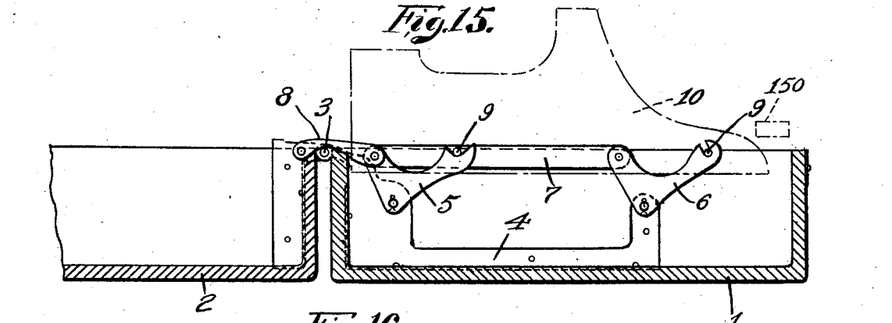
Figs. 15 and 16 diagrammatic sections of the encasements of the machine.
Figure 16:
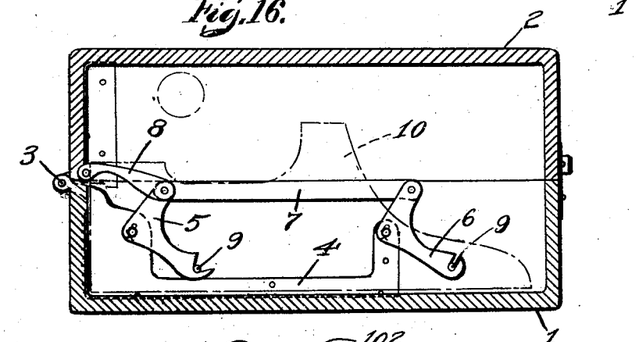

My machine makes possible constructions in such condensed mechanical form that there is no lost space in the mechanism itself for unnecessary movements. As will appear hereinafter, certain phases of movement are so planned as to bring them outside of the mechanism of the machine itself. In order to encase my machine therefore and provide for the desired movement of the parts beyond the normal confines of the machine, I provide my machine and case with an elevating relation so that when the case is open the machine which has been snugly contained therein will be raised or jacked clear of the plane of the base of the case so as to provide for the necessary movements (see Figs. 15, and 16).

While my machine is adapted to any style of mount or casing, I have in the form selected shown it mounted in a divided case consisting of a base 1 and cover 2 hinged at 3.

Encasement.

In effecting the compact relationship above referred to, I provide the lower section 1 of my case with interior lateral plates 4 to which are pivoted bell cranks 5 and 6 connected at their upper ends by a link 7. The rear bell crank 5 is coupled by a bent link 8 with the cover member 2 so that in opening and closing the cover 2 the bell cranks 5 and 6 are rocked, elevating the machine indicated in broken lines from the position shown in Fig. 16 to the position shown in Fig. 15.

The machine proper is therefore preferably mounted on the bell cranks 5 and 6, the free ends of which have openings to receive supporting studs 9 set in the side frames 10 of the machine. The machine itself is readily releasable from its case by springing the free arms of the bell cranks 5 and 6 to release the studs 9.

Frame structure.

The lateral frames or plates 10 of the machine support a pair of angle shaped key guiding combs 11 and 12 adjacent the front of the machine and at the rear of the machine are bridged by a transverse deck 13 arranged at the back of the machine on which the platen and ribbon groups are mounted.

The side plates are further braced by cross rods 32, 33, 40 and 44, all of which act as fulcrums and rock shafts. The rod 32 is a rock shaft which is operated by the spacer bar 150 carried on the levers 151, 152. The rod 33 carries the shift key 41 by which it is rocked and also serves as a fulcrum for one row of type keys. The bar 40 is also a rocker shaft carrying the universal bar 66 by which it is rocked.

Type group.

Depending from this transverse member 13 are a pair of vertical slideways 14 in which is guided a frame 15. Suspended within the frame 15 is a segmental type bar holder 16. This holder is radially slotted on its inner face as indicated at 17 and is grooved along its inner surface for the reception of the arc shaped pintle 19. The type bars 20 are, in the form shown, provided with a double type head on the long arm of the lever and are perforated at their opposite ends to receive the hooked end 21 of the connecting rod 22 which is hooked at its opposite end to the key lever 30.

Adjacent the lower end of the type bar 20 a semi-circular hook 23 is formed, (see Figs. 20 and 21) adapted to be passed under the pintle wire 19 so as to be pivotally held thereby within the segment 16. A segmental plate 16$^1$ covers the slots 17 and prevents the type bars from becoming unhooked in action.

Opposite this hook is an angular extension 20$^1$ of the short actuating lever 20 making of the lever a bell crank with one long arm formed by the type bar and one short arm 20$^1$ to which the connecting rod 22 is attached. The connecting rod 22 is given two square turns forming a hook which lies in the plane of movement of its type bar 20 and is in substantial parallelism therewith.

Key group.

The keys are arranged in a standard bank as desired, each row being hung on one of the common transverse pivots 32 or 33. The actuating key for each type bar is so bent with reference to its pivot as to swing in substantial alinement with the end of its type bar.

The type keys 30 are preferably formed in somewhat triangular shape having at their upper ends hooks 31 adapted to engage the cross rods 32 and 33 so that the key is pendent thereon hanging with one side of its triangular frame substantially vertical. This constitutes the thrust member of the key. The connection 22 is hooked in this side of the frame, the point of pivot travelling in a short substantially horizontal arc of thrust. The sides of the triangular frame carry forward and constitute the key extension being upturned to receive the key or finger disc 34 which is depressed in writing to impart the rocking movement to the vertical thrust member of the key.

Upon the depression of the key in writing, the lever is swung backward so that its connection with the link 22 has a short substantially horizontal arc of movement. This imparts to the link 22 substantially longitudinal reciprocation which in turn imparts a direct pull on the short arm 20$^1$ of the type bar, throwing the bar into vertical position for type contact with the platen 52. Each key 30 is guided in corresponding slots in the combs 11 and 12, these openings being alined to permit the key to have free swing.

Shift.

The rod 33 is a rocker for the shift. On it is mounted at each end adjacent the side plates 10 a shift key 41. This key is also a pendent key but is fast to the shaft 33 to rock it. One arm of one key 41 is connected by a wire link 42 with a lever 43 on a bar 44 extending at the rear of the machine between the side plates 10.

Figure 5:
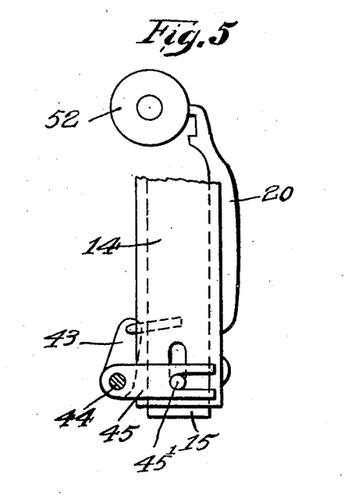
Figure 6:
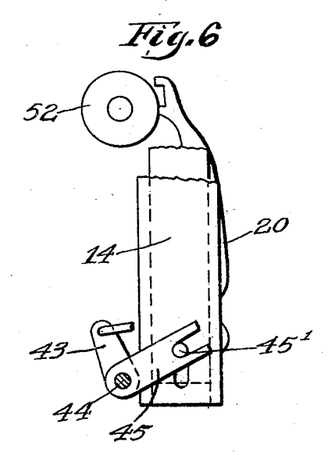

A lever 45 on the shaft 44 is set adjacent the segment guides 14. This lever is slotted as shown in Fig. 5 and engages at its forward end a stud on the frame 15 which carries the type bar segment 16 so that the type bar segment is raised and lowered upon the depression of the shift key.

Comb alinements.

The vertical slotting of these combs 11 and 12 is so arranged as to guide the keys 30 in their proper position. It will be noted that whereas these keys 20 are hung on the pair of transverse pivot rods 32 and 33 between the end frames 10, they are so bent as to work in planes which are fore and aft of the machine but which are in reality converging towards a central vertical plane in which the central key 30 openings lie. For the purpose of simplification of the illustration only one of these keys 30 is shown, but it will be understood that there is an entire set of keys each hung on its proper guide rod and each guided between pairs of teeth on the combs 11 and 12, the included slots of which lie in the plane in which the key is to act.

The converging plane of each key lever is directed substantially towards that part of the periphery of the segment 16 in which its corresponding type bar is pivoted. The connecting link 22 which couples the thrust side of any key with the short lever of its type bar works in a plane which is vertical and which passes just outside the pivot of its type bar. The end of each link is bent twice so as to pass round the back side of the type segment 16 and engage the short arm 20¹ of the type bar in the rear so that the thrust upon the link 22 imparts a pull on this short lever 20¹ and snaps up the type bar to make it strike.

The bent end 21 lies in the plane in which the type bar works. In order to guide this bent end of the lever and maintain its movement in the plane of movement of the type bar, I provide a third comb guide 121. This comb guide is segmental and disposed about the periphery of the type segment 16 on the rear side thereof. It therefore combines with the comb guides 11 and 12 to preserve in their proper relative planes of working each key lever with its corresponding type bar and connecting link.

Carriage group.

On the transverse deck 13 of the frame I provide a guideway defined on one side by an upturned flange 13¹ and on the other side by an undercut strip 132. Between these two lateral guiding members is slidably mounted the base 50 of the carriage or platen frame which has at opposite ends bearings 51 in which the platen 52 is journaled. The base 50 is slightly upwardly inclined along its rear portion and provided with a rib on the lower face of which is formed the rack 54.

Figure 12:
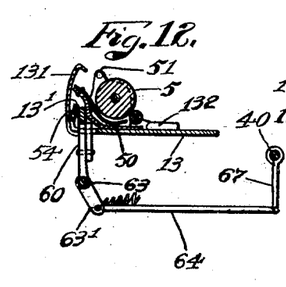
Figs. 12 and 13 are sectional detail views of the platen carriage and escapement, Fig. 14 a rear elevation of the machine.
Figure 13:
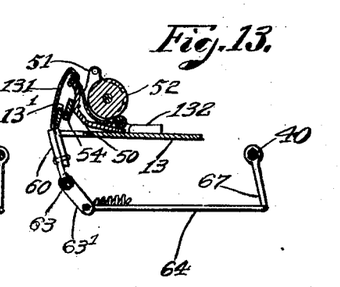
Figure 14:
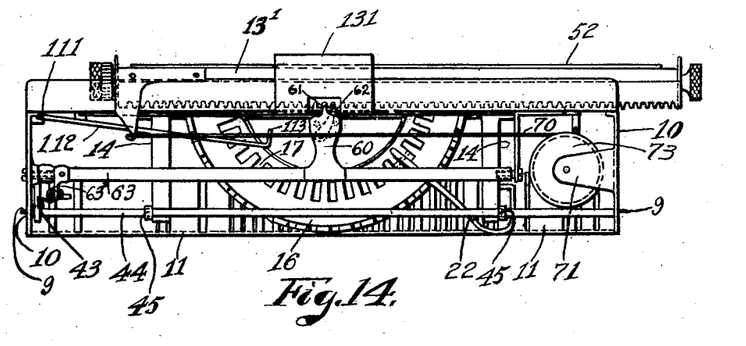

About the upturned flange 13¹ near its center is an extension 131 longer than the flange 13¹ so as to permit the whole carriage to be rocked forward as shown in Fig. 13. This permits the clearance of the rack 54 and the freeing of the carriage from the teeth 61—62 of the escapement lever 60. Of these the tooth 61 is the fixed tooth and the tooth 62 the yielding pivotal tooth in this escapement. The carriage is rotated about the support comprising the under-cut strip 132 until the back of the carriage bed engages with the lip on the upper end of the extension 131. A carriage is shown in its normal position in Figure 12 and in the lifted position in Figure 13.

Figure 4:
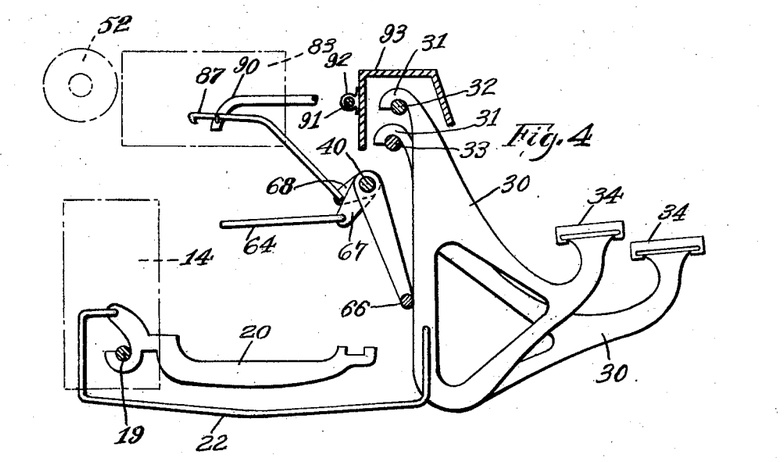
Fig. 4 a similarly treated detail of type keys and connections.

The lever 60 on the rock shaft 63 is moved by a lever 63¹ connected by a link 64 which is connected to the lever 67 which is operated by the key engaged universal bar 66, on the rock shaft 40 (see Fig. 4). It is also operated by the spacer bar 150.

The carriage is moved by a cord 70 wound on a drum 71 against the tension of a motor spring 72 mounted on the frame in vertical alinement with the transverse slideway of the carriage.

Spacer bar.

As heretofore explained, the machine shown is of minimum size and is adapted to be enclosed in a case of minimum size. In the arrangement heretofore discussed the machine is so snugly boxed in by its case that it must be raised therefrom to give it operating clearance. To effect the greatest compactness, I mount my spacer bar 150 on lever 151, hinged at 152. The forward part of the lever 151 has an overlap 153 which engages with the forward end of the rear section of the lever to give a positive engagement on the down stroke. When the machine is to be closed up the bar 150 is folded back on the key-bank and the machine snugly dropped within the box member 1.

Carriage lock.

Figure 1:
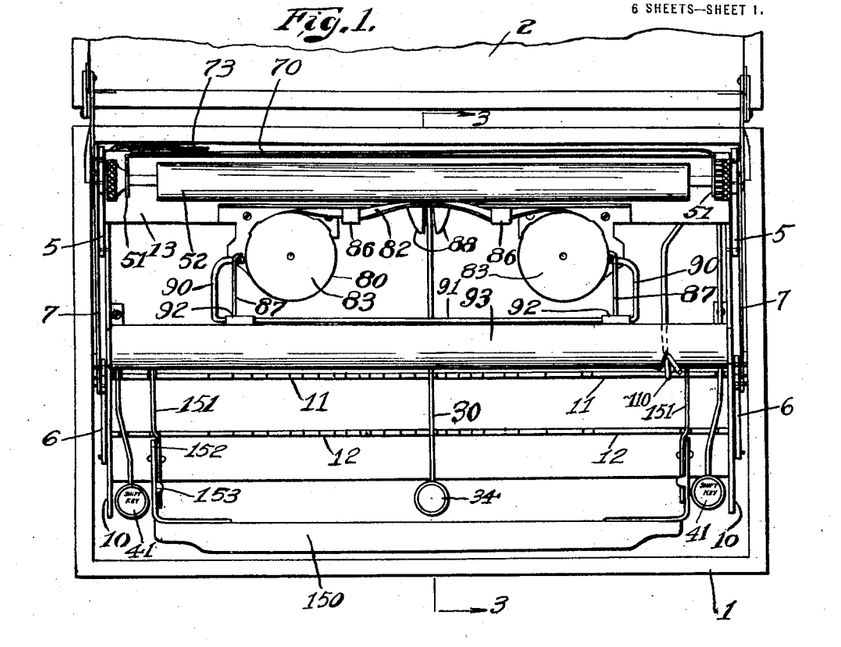
Fig. 1 is a plan view showing a machine in accordance with my invention, but not fully assembled, certain parts being omitted for clarity of illustration.
Figure 2:
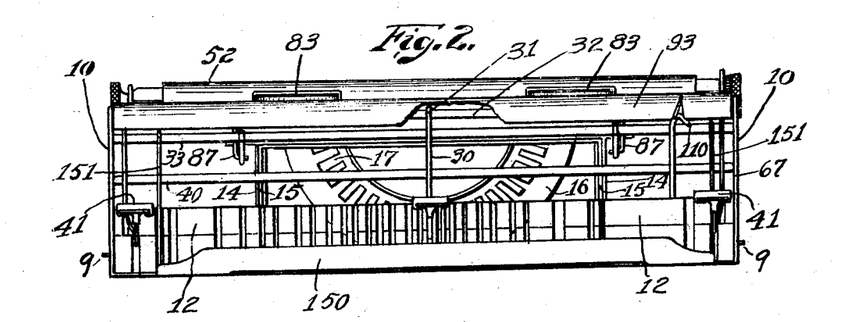
Fig. 2 is a front elevation of such machine in similar partial detail.
Figure 3:
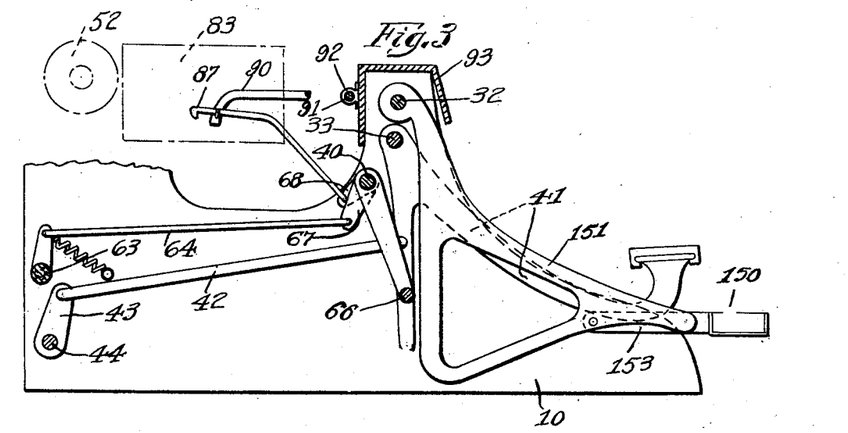
Fig. 3 is a detail of the spacer and shift key and connections.
Figure 7:
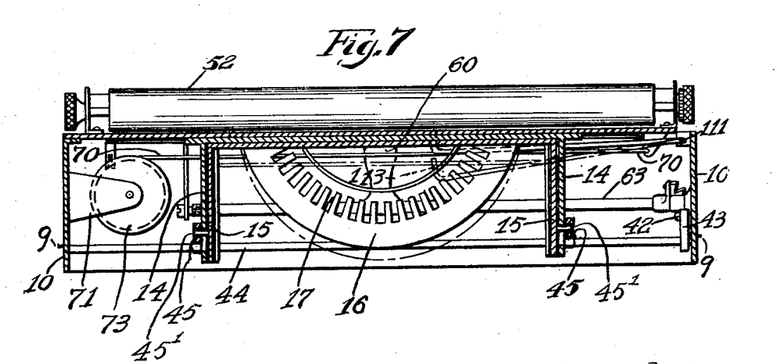
Figure 8:
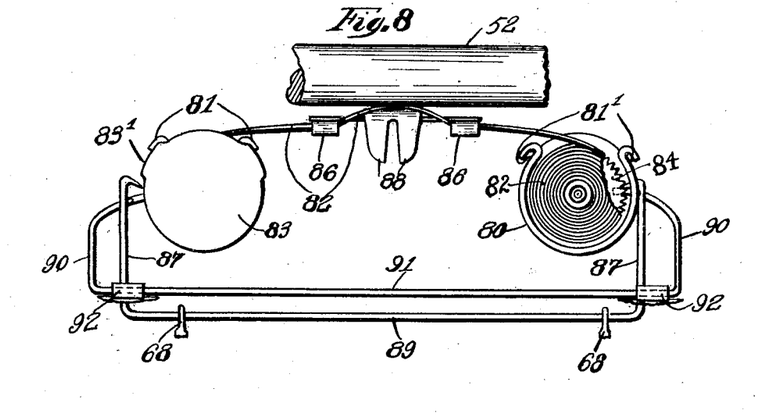
Figure 9:
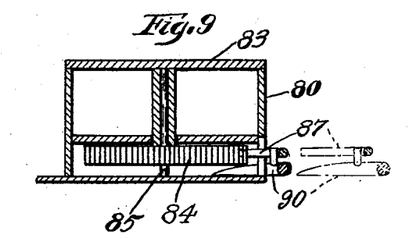
Figure 10:
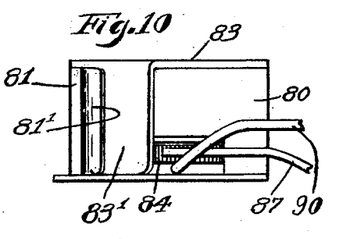
Figure 11:
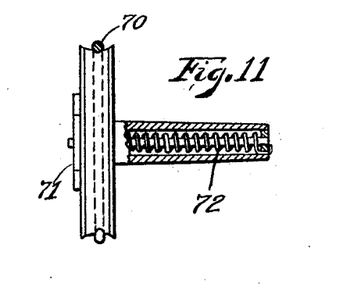

In order to assure the proper position of the platen carriage 50 with the frame so that the machine may disappear freely within its encasement 1, without striking the sides, I provide a locking system. Just above the type bank appears a short vertical lever 110 (see Fig. 2) pivoted to be transversely rocked in the comb 11, and extending back and having bearing at 111 in the frame (see Fig. 7).

From this another lever end 112 extends across the machine terminating in an angle shaped point 113, which normally lies just below the bridge 13 of the machine. The entire locking piece is of piano wire and the lever end 110 puts torsion enough on the whole to set the angle shaped end 113 against the carriage under a tension.

The bridge at this point has an opening and there is a corresponding recess 114 in the base 50 of the platen carriage.

The stock of the lever 112 is resilient as above explained so that when the lever 110 is rocked the point 113 is yieldingly pressed against the base 50 of the platen carriage. If now the platen carriage be slid to central alinement the point 113 will enter the recess 114 and lock the carriage in that position. This prevents any accidental lateral movement of the carriage while the machine is being carried or while it is being raised or lowered into position.

Ribbon group.

Bracketed on the bridge 13 are mounts for a pair of ribbon cases 80. These cases are cylindrical open top boxes opened at 81 for the passage of the ribbon 82. The edges of the openings 81 are bent back as at 81¹ to receive the legs 83¹ of the covers 83. In the bottom of each case is a ratchet member 84 resting on the bottom of the case but freely rotatable therein. The ribbon rolls at each end of the ribbon 82, lie over a central spindle 85 on the member 84. The ribbon in passing from one case to the other runs out through the opening 81 passing under a pair of hooks 86. Between these hooks is a guide 87 which holds the ribbon adjacent the platen 52. The upper end of this guide is notched leaving a pair of type bar alining jaws 88 which assure the alignment of the type at the proper spot.

The ratcheted members 84 are alternately actuated by oppositely disposed pawls 87 formed on the ends of a pawl bar 89 connected with the short arms on the rock bar 40 which carries the universal bar 66.

The ends of the pawls 87 are guided on the opposed inturned and wedge shaped ends 90 of a bar 91 shiftably held at 92 on the rear of the key lever pivot cover 93. Upon shifting this bar 91 in one direction a wedge end 90 is radially inserted under the ratchet member 84 which is to be actuated. This movement engages the pawl 87 carried by the wedge end 90 which is moved and at the same time the wedge raises the member 84 and thus engages it with sufficient friction to hold it during the retraction of the pawl for engaging the next succeeding ratchet tooth on the periphery of the member 84. (See Figs. 7-10.)

The ribbon feed is therefore reversed by simply shifting the bar 91 laterally of the machine to release one pawl and wedge and engage the pawl and wedge with the member of the other ribbon case.

The member 84 of the case from which ribbon is being drawn rests on the smooth bottom of the ribbon case and runs free.

*Ribbon group, (ribbon supply.)*

The ribbon R for my machines may be of any usual type but preferably as shown consist of a ribbon fill furnished in a loading clip all ready to insert without touching with the fingers.

A ribbon 82 wound at opposite ends in reverse rolls 82¹ is carried on the forked end arms 101 of a clip 100. This clip has lateral arms 102 midway of its length across which the connecting length of the ribbon is laid.

The length of the clip 100 between its end arms 101 is just equal to the distance between centers of the ribbon cases 80 and the forked ends of the arms 101 are adapted to embrace the central studs 84¹ of the ratchet members 84 so that the ribbon rolls will readily be guided to and slip over these studs 84¹.

The lateral arms 102 of the clip 100 are offset from the line of the arms 101 sufficiently to act as guides for lodging the ribbon behind the part 87.

Figures 17, 18, 19, 20, 21:
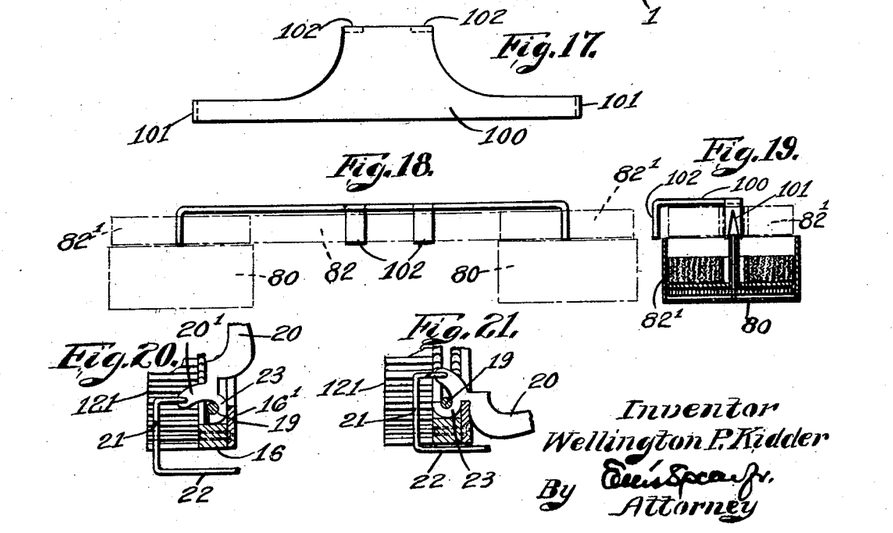
Figs. 17, 18 and 19, plan, side and end views of the ribbon carrier with manner of use in putting ribbons on machines indicated in the two latter figures.
Figs. 20 and 21 are sectional details of detachable key assembly on the key segment taken through the comb slot to show the type bar ends.

The ribbon rolls are simply pushed off the arms 101, the central webb pushed free of the lateral arm 102 which embraces the guide 88 as indicated in Fig. 19. The intermediate section of the ribbon 82 is pushed under the hooks 86, all by the point of a lead pencil or other convenient instrument so that the fingers do not have to contact the ribbon itself.

The covers 83 are removed before and replaced after loading. When the ribbon has once been lodged in its cases the machine may be freely handled, packed, carried or shipped without danger of dislodgment of the ribbon in spite of the fact that the ribbon system is substantially a floating one as regards its rolls.

*General operation.*

The general operation of the machine hereinbefore described is as follows:

Upon the opening of the cover 2 of the case, the entire typewriter is elevated on the bell cranks so that it is entirely clear from the base 1. This leaves ample room for the movement of the connecting links 22 which necessarily in their play work below the bottom level of the frame. Furthermore, it permits clearance for the space bar which may now be unfolded and lie free and clear of the key bank. It will be noted from Figs. 15 and 16 that as the machine is raised in its box it necessarily has a slight forward movement in the initial step of raise followed by a rearward movement to the swing of the bell cranks which carry it.

The machine being now raised and the platen carriage 53 moved into proper position, thus bringing the spring 72 of the drum 73 under tension, the keys 30 may be depressed to effect the desired writing. Upon the depression of each key 30 the connecting link 22 is thrust rearwardly in substantially the plane of movement of the key, its end bent in the plane of movement of its type bar; pulling up the corresponding type bar causes the type to impinge upon the paper centrally of the guide 88.

Spacing is effected by depression of any key or by the spacer bar which rocks the universal bar 66, which is hung transversely of the machine in front of the vertically depending web 31 of the keys and is rocked on each movement thereof. This imparts through the pawl 87 a step by step movement of one of the ribbon spools thus feeding the ribbon 82 past the point of impact of the type.

The ribbon feed is reversed by shifting the bar 90 laterally of the machine, thus allowing one ribbon spool to drop and removing the pawl therefrom, jacking up the other ribbon spool and engaging the pawl therewith. The shift to upper or lower case is effected by rocking either of the keys 41 which through the links 42 rock the levers 43 which through the shaft 44 and forked arms 45 raise the frame 15 vertically in the slideway 14 thereby raising or lowering the type segment 16.

In closing up the machine, the space bar 150 is folded on its pivots 152 and upon the closing of the cover member 2 the machine disappears snugly within its case.

Various modifications in the construction and operation of my machine may obviously be made, all without departing from the spirit of my invention if within the limits of the appended claims.

What I therefore claim and desire to secure by Letters Patent is:—

1. In a typewriter, a transverse fulcrum, and a hooked end key lever mounted thereon, a type bar fulcrumed below the fulcrum of said key lever, a reciprocating connecting link between said type bar and the depending end of said key lever, and a key arm on said key lever and disposed in substantial alinement with the key lever.

2. In a typewriter, a transverse fulcrum, and a hooked end key lever mounted thereon, a type bar fulcrumed below the fulcrum of said key lever, a reciprocating connecting link between said type bar and the depending end of said key lever, a key arm on said key lever, and type key guides disposed in substantial alinement with the plane of the key levers.

3. In a typewriting machine, a segmental key pivot block having its inner face radially slotted and longitudinally grooved, a curved fulcrum bar in said longitudinal slot, type bars having hooked fulcrums disposed in said slots and engaging said bar, and a segmental cover plate backing said hooked fulcrums to prevent unhooking.

4. In a typewriting machine, a segmental key pivot block having its inner face radially slotted and longitudinally grooved, a curved fulcrum bar in said longitudinal slot, type bars having hooked fulcrums disposed in said slots and engaging said bar, and a segmental cover plate backing said hooked fulcrums to prevent unhooking, and having its upper edge lying in position of support for said bars when unactuated.

5. In a typewriting machine, a pendulous key lever comprising a substantially vertical thrust member and a substantially horizontal key arm, a type bar comprising a type arm, and an angular lever end thereon, and pivoted in the angle of said bar, and a pivotally connected actuating link between said key and bar.

6. In a typewriting machine, a pendulous key lever comprising a substantially vertical thrust member, and a substantially horizontal key arm disposed below the pivot thereof, a type bar comprising a type arm, an angular lever end thereon, a pivot in the angle of said bar, and an operating connection between said lever and arm having a substantially reciprocating movement, and engaging said angular lever end to rock said bar from its normal position.

7. In a typewriting machine, a transverse key rod, and a plurality of key levers each comprising a substantially vertical thrust member, and a substantially horizontal key arm and hung on said rod from the upper ends of their vertical members, a plurality of type bars each comprising a type arm, an angular lever end thereon in the plane of movement of the arm, a pivotal mount at the angle thereof, and hooked end connecting rods, the end of each having a substantially reciprocative movement in the normal plane of said type bar, and engaging said angular lever end to rock said bar from its normal position.

8. In a typewriting machine, a pendulous key lever having a substantially horizontal arc of thrust, and a substantially vertical key depression, a vertically disposed segmental type bar pivot block, a type bar pivoted in said block, and an operating link passing under said segmental block and connecting said type bar and key lever and having a hooked end passing around said block to engage said bar.

9. In a typewriting machine, a pendulous key lever having a substantially horizontal arc of thrust, a type bar comprising a normally horizontal type arm, a vertically disposed lever end thereon, a pivot in the angle of said bar, and an operating connection between said key lever and type arm having a substantially reciprocating movement in the normal plane of said type bar and engaging said angular lever end to rock said bar from its normal position.

10. In a typewriter, lateral frames, cross bars between said frames constituting a rocker shaft for space and shift key, and key levers pivotally mounted on said cross bars for movement independent of the rocking thereof.

11. In a typewriter, lateral frames, cross bars between said frames constituting a rocker shaft for space key, shift key and universal bar, key levers pivotally mounted on one or more of said cross bars for movement independent of the rocking thereof.

12. In a typewriting machine, the combination of a printing platen; a type bar segment located below said platen; type bars in said segment, and normally substantially horizonally disposed; key lever fulcrums substantially in front of said platen; depending key levers mounted on said fulcrums; and operating links directly connecting said key levers with said type bars.

13. In a typewriting machine, the combination of a type bar segment; a plurality of type bars mounted in said type bar segment; a plurality of pendant key levers mounted in front of said type bars and connecting links extending between said key levers and said type bars and beneath the normal position of said type bars, said links being connected to said type bars above the pivots thereof whereby said type bars are pulled to printing position when said key levers are operated.

In testimony whereof I affix my signature in presence of two witnesses.

WELLINGTON P. KIDDER.

Witnesses:
 MARION F. WEISS,
 VICTORIA LOWDEN.